United States Patent [19]

Komaba et al.

[11] 4,017,181
[45] Apr. 12, 1977

[54] COPY MEDIUM CARRIER

[75] Inventors: Shiro Komaba; Yoshitomo Goshima, both of Kawasaki, Japan

[73] Assignee: Canon Kabushiki Kaisha, Tokyo, Japan

[22] Filed: Dec. 22, 1975

[21] Appl. No.: 643,194

Related U.S. Application Data

[63] Continuation of Ser. No. 465,603, April 30, 1974, abandoned.

[30] Foreign Application Priority Data

May 8, 1973 Japan .............................. 48-51470

[52] U.S. Cl. ..................................... 355/72; 271/9; 271/127; 271/162; 355/26
[51] Int. Cl.² ..................... G03B 27/58; B65H 1/12; B65H 1/28
[58] Field of Search ................. 355/72, 73, 23, 26; 271/9, 127, 162, 10, 118, 121, 164; 354/174, 177

[56] References Cited

UNITED STATES PATENTS

| | | |
|---|---|---|
| 3,273,883 | 9/1966 | Baronnie ............................... 271/9 |
| 3,599,966 | 8/1971 | DelVecchio .................... 271/162 X |
| 3,599,972 | 8/1971 | Miciukiewicz ...................... 271/127 |
| 3,753,560 | 8/1973 | Kapral et al. ........................... 271/9 |
| 3,806,112 | 4/1974 | Melby et al. .................. 271/127 X |
| 3,871,640 | 3/1975 | Ritzerfeld ................................ 271/9 |
| 3,920,238 | 11/1975 | Kitajima et al. ....................... 271/9 |
| 3,936,042 | 2/1976 | Smith et al. ............................ 271/9 |

Primary Examiner—Richard A. Wintercorn
Attorney, Agent, or Firm—Fitzpatrick, Cella, Harper & Scinto

[57] ABSTRACT

A copy medium carrier for use with a copying machine or the like comprises a first copy medium containing chamber for containing therein a first load of copy mediums, and a second copy medium containing chamber for containing therein a second load of copy mediums. The first copy medium containing chamber is selectively pivotable to feeding position. The second copy medium containing chamber is selectively movable to the feeding position. The feeding from said first and said second copy medium containing chamber may be effected from the same feeding position.

8 Claims, 18 Drawing Figures

COPY MEDIUM CARRIER

This is a continuation of application Ser. No. 465,603 filed Apr. 30, 1974 and now abandoned.

BACKGROUND OF THE INVENTION

1. Field of the Invention

This invention relates to a copy medium carrier which permits one-side printing and both-side printing to be selectively effected on conventional copy mediums, instead of one-side printing only

2. Description of the Prior Art

Conventional copying machines have generally been of the one-side printing type in which only one-side printing is effected on copy mediums. According to such conventional method, however, the number of copies produced is double the number of copies produced by the both-side printing system and, where a huge quantity of copies is to be stored, this has been disadvantageous in terms of storage space, weight, cost, etc. The present invention intends to eliminate these disadvantages peculiar to the one-side printing and to provide a copy medium carrier which permits the both-side printing to be effected as well.

Several types of copying apparatus capable of both-side printing have heretofore been considered. A first of them is the type which employs two photosensitive drums for forming thereon discrete images to be transferred to the opposite sides of copy medium, respectively. This type is simple in principle but involves two sets of copying processes, which leads to a high cost and large scale of the apparatus. A second type is that in which an image to be transferred to one side of copy medium is first formed on a photosensitive drum and such image is transferred to an intermediary drum for temporal preservation, whereafter an image to be transferred to the other side of the copy medium is formed again on the photosensitive drum, and then these images are transferred from the intermediary drum and the photosensitive drum to the respective sides of the copy medium. The system requires only one set of copying process, but involves two cycles of image transfer through the intermediary drum and this means a reduced efficiency of image transfer. In a third type, ordinary one-side printing is effected on one side of copy medium, whereafter such one-side printed copy medium is again directed to the copy medium feed means or to a second feed means, from which the copy medium is fed in up-side-down fashion into the copying apparatus so that ordinary one-side printing is effected on the other side of the copy medium. This third type involves only one set of copying processes as in the case of one-side printing and may be said to be an economical and compact copying apparatus which can perform both-side printing in the most practical manner, as compared with the first or the second type which has disadvantages of expensiveness or large scale of the apparatus or reduced efficiency of image transfer, as noted above.

Where both-side printing is to be effected with a cassette system copying machine as the third type, it has heretofore been the practise that a copy medium discharged with one side thereof printed is placed into another carrier (cassette or the like) for the other side of the copy medium to be printed, and then the previously used cassette is removed from te copying machine and replaced by said another carrier so that the other side of the copy medium may undergo one-side printing similar to the previous one. However, wher it is desired to obtain a few copies of various originals by both-side printing, the cassette loading and unloading must be effected frequently and the cassette replacement involves cumbersome procedures, and this also offers a problem as to the service life of the cassettes.

Further, according to the conventional system, different cassettes respectively containing therein different sizes of copy mediums are prepared and one of these cassettes may be loaded into the feed means of the copying machine or the like. Although such system is efficient in that replacement of copy mediums can easily be done by replacement of the cassettes, a plurality of cassettes must be prepared for respective sizes of copy mediums and a space is required for the storage of these cassettes, but this has been undesirable from the standpoint of moisture-proof or dust-proof effect and also has involved cumbersome procedures or troubles in operation.

In the conventional carrier (cassette), loading of the carrier with copy mediums or the like has been done by depressing a carrying portion for carrying copy mediums or the like to widen the spacing between such carrying portion and a separating portion for separating the copy mediums so as to permit the copy mediums to be inserted into between the two portions, whereas the spacing between the separating portion and the copy medium carrying portion has not been sufficiently wide with respect to a posible full load of copy mediums so that the loading operation has not been easy.

More specifically, in case of the conventional carrier, a load of copy mediums is inserted into the carrier in accordance with a reference mark provided on the rear side of an inner plate. At this time, the leading end of the load of copy mediums rests on a separator pawl. If the load of copy mediums is then depressed in the center portion thereof, the inner plate is also lowered to cause the leading end of the load of copy mediums to come beneath the separator pawl due to the self-supporting action of the load of copy mediums, so that the load rests on the inner plate. When the force imparted to the center portion of the load of copy mediums is released, the inner plate and accordingly the load thereon is raised by the force of springs until the load of copy mediums and the separator pawl hitherto lowered to its lowermost position reach their uppermost positions, whereupon the loading completes.

In such conventional carrier, the above-described self-supporting action of the load of copying mediums would offer no problem if there is a great spacing between the separator pawl in its lowermost position and the upper side of the load of copy mediums when the load has been depressed, but difficulties would be encountered if the load of copy mediums is increased and the spacing decreased.

SUMMARY OF THE INVENTION

It is therefore an object of the present invention to provide a copy medium carrier usable for both-side printing.

It is another object of the present invention to provide a copy medium carrier which is capable of containing therein various types of copy mediums.

It is still another object of the present invention to provide a copy medium carrier which enables quick both-side printing to be effected.

It is yet another object of the present invention to provide a copy medium carrier which may be detachably mounted with respect to the body of a copying machine.

It is a further object of the present invention to provide a multi-stage copy medium carrier.

According to the present invention, the carrier (cassette or the like) comprises two upper and lower copy medium containing chambers. Usually, the copy mediums fed from the lower containing chamber into a copying machine may undergo one-side printing and thereafter be discharged onto a tray. These copy mediums with one-side printing completed may now be disposed for the other side thereof to be printed, and inserted into the upper copy medium containing chamber of the carrier which remains positioned within the copying machine. Through a simple operation, the copy mediums may be fed from the upper chamber to undergo one-side printing again, thus accomplishing both-side printing.

Where copies of different sizes are to be produced by a conventional cassette system copying machine, it has been necessary to prepare a plurality of cassettes corresponding to those different sizes of copy mediums and to interchange one cassette with another. According to the feed cassette of the present invention, copy mediums of different sizes may be precontained in the upper and lower copy medium containing chambers, respectively, whereby the copy mediums may be selectively used without the need to remove the cassette.

Further, even where the quantity of copy mediums to be inserted is small, a greater spacing between the separator pawl and the top surface of the load of copy mediums would more facilitate the loading operation. Therefore, according to the present invention, both the separating portion and the copy medium carrying portion are made pivotable to provide a sufficiently wide spacing so that a full load of copy mediums may readily be inserted therethrough.

The invention will become more fully apparent from the following detailed description thereof taken in conjunction with the accompanying drawings.

DESCRIPTION OF THE PREFERRED EMBODIMENTS

Figure 1:
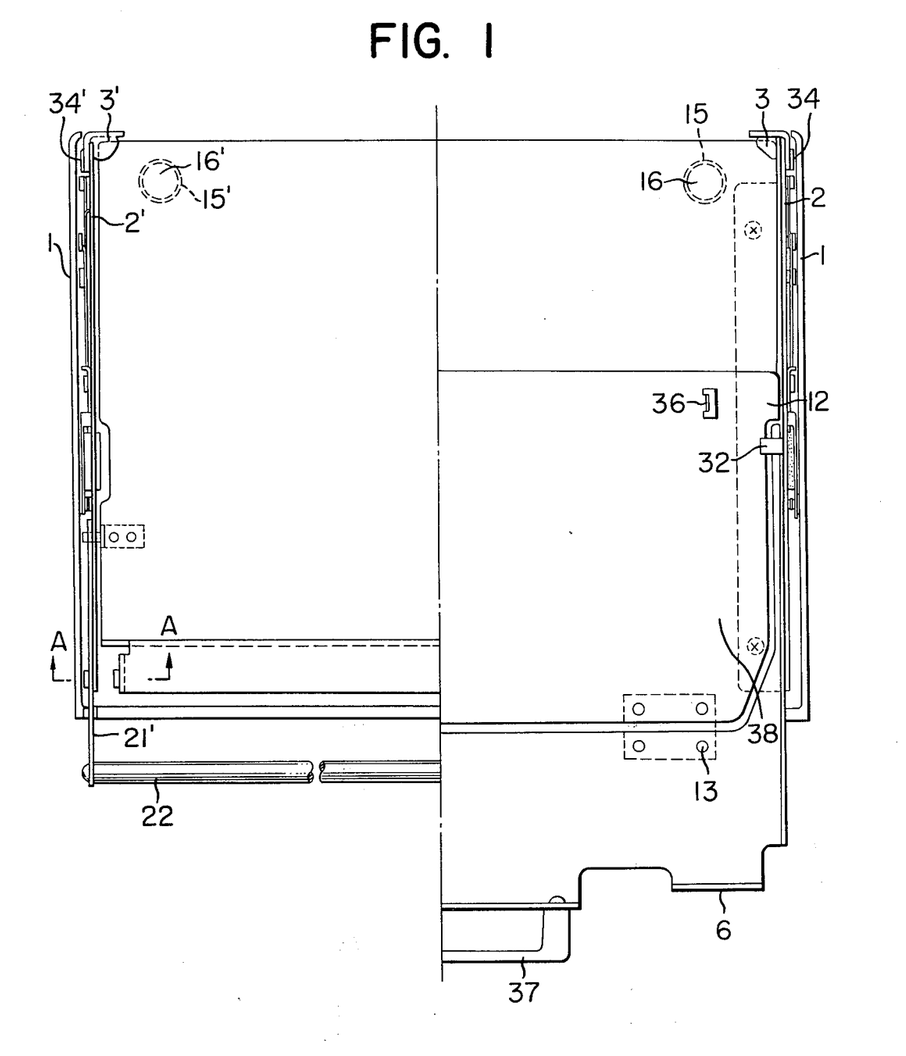
FIG. 1 is a plan view of the copy medium carrier according to the present invention, with the left half or a second containing chamber being omitted.
Figure 2:
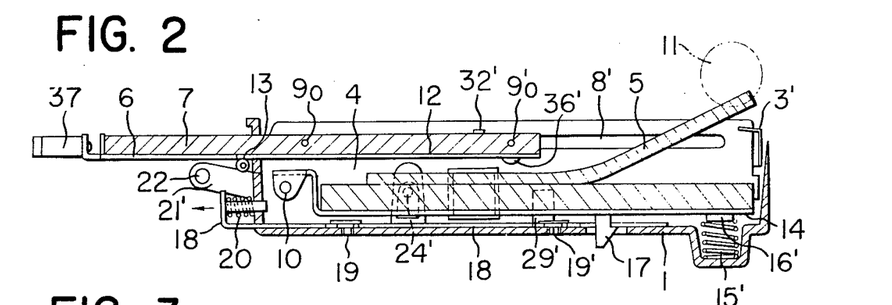
FIG. 2 is a cross-sectional view corresponding to FIG. 1 and showing the manner in which a first load of copy mediums is inserted.
Figure 3:
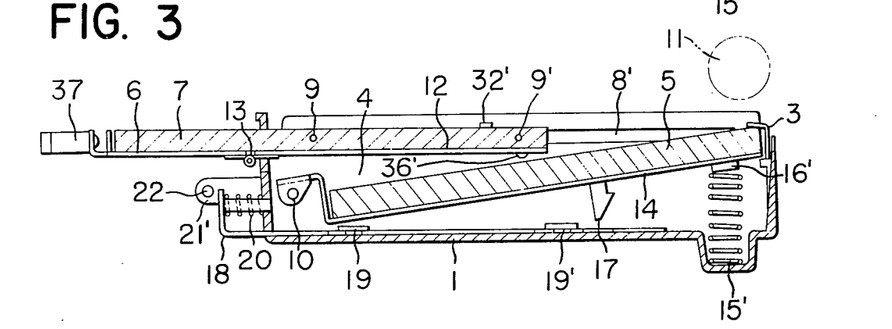
FIG. 3 is a cross-sectional view corresponding to FIG. 1 and showing the manner in which feeding is effected from the first load of copy mediums.
Figure 4:
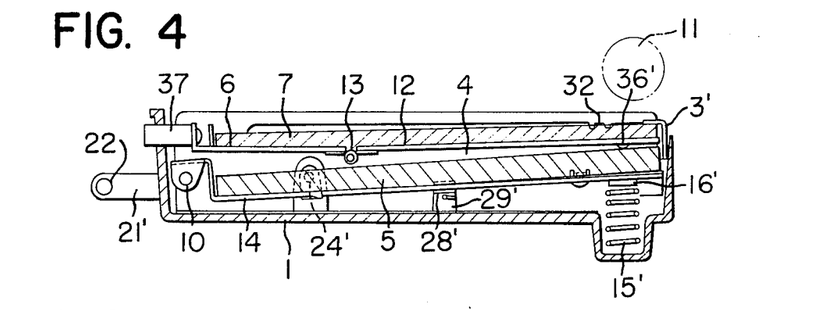
FIG. 4 is a cross-sectional view corresponding to FIG. 1 and showing the manner in which feeding is effected from a second load of copy mediums.
Figure 5:
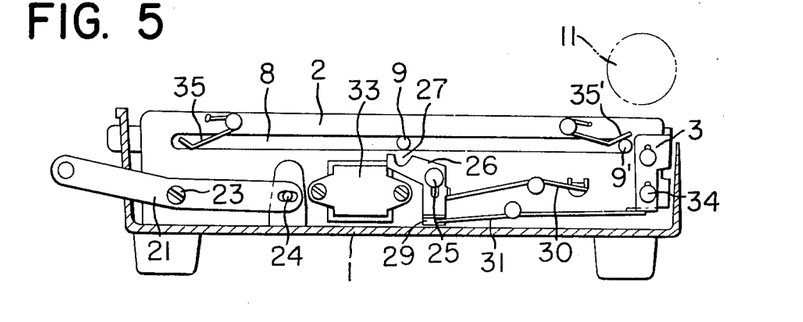
FIGS. 5 and 6 are side views corresponding to FIG. 1, with the cassette body being omitted.
Figure 6:
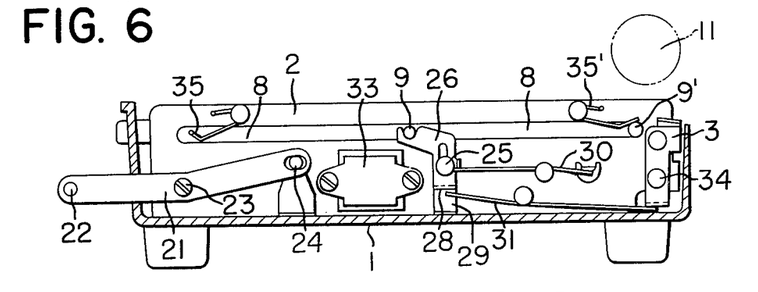
Figure 7:
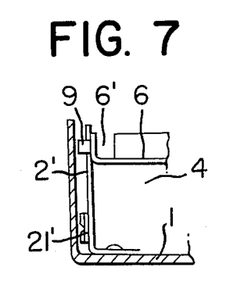
FIG. 7 is a cross-sectional view taken along line A—A of FIG. 1.
Figure 8:
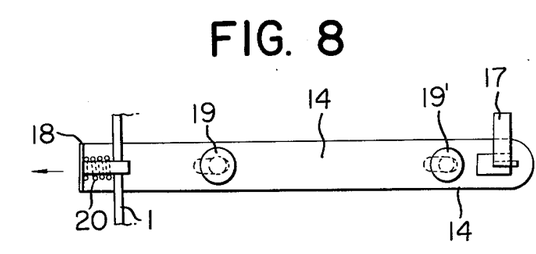
FIG. 8 shows a lock mechanism for the first copy medium containing chamber.

Referring to FIGS. 1 to 7, a cassette body is designated by 1 and opposite side plates for positioning copy mediums are designated by 2 and 2', respectively. The side plates are secured to the cassette body 1 and define a first copy medium containing chamber 4 for containing therein a first load of copy mediums 5 (hereinafter referred to as "the first containing chamber 4"). Adjacent a feed means 11, these side plates are provided with separator pawls 3 and 3' vertically movable along shafts 34 and 34', respectively. A member 6 is provided to form a second copy medium containing chamber 38 for containing therein a second load of copy mediums 7 (hereinafter referred to as "the second containing chamber 38'). The member 6 has secured thereto guide shafts $9_0$, $9_0'$, 9 and 9' which are slidably fitted in elongated slots 8 and 8' formed in the side plates 2 and 2'. On the bottom surface of the member 6, a second inner plate 12 for carrying thereon the second load of copy mediums 7 is mounted only for upward pivotal movement by means of a hinge 13. A first inner plate 14 for carrying thereon the first load of copy mediums 5 is pivotally mounted on a shaft 10 secured to the cassette body 1, and an inner plate lock pawl 17 is secured to the center portion of the first inner plate 14 for locking the first inner plate near the bottom surface of the cassette body 1. Compression springs 15 and 15' are provided inside the cassette body 1 adjacent the separator pawls 3 and 3' and press against spring seats 16 and 16' provided on the underside of the first inner plate 14 to impart upward force to such plate. A lock plate 18 for locking the first inner plate 14 near the bottom surface of the cassette body 1 is slidable along guide screws 19 and 19' and resiliently urged by a spring 20 in the direction of arrow as indicated in FIG. 2. In FIGS. 5 and 6, levers 21 and 21' are mounted for rotation about stepped screws 23 and 23' on the side plates 2 and 2', respectively. A handle 22, which also serves as the means for trasporting the cassette of the present invention, is secured to the levers at one end thereof, and the other ends of these levers are engaged with shafts 24 and 24' secured to the first inner plate 14. A member 26 for positioning the second containing chamber 38 and for preventing wrong operation has a recess 27 formed at one end thereof for engagement with the guide shaft 9 or 9' and an L-shaped bent portion 28 formed at the other end. The member 26 is vertically movable under the control of guide shaft 25 and square hole 29 formed in the side plate 2, and is normally biased upwardly by a spring 30. The L-shaped bent portion 28 intervenes between the first inner plate 14 and the cassette body 1 so that lowering of the first inner plate 14 depresses the bent porion 28 to lower the member 26 so as to break the engagement between the recess 27 and the guide shaft 9 or 9'. A spring 31 is rockably mounted on the side plate 2, and has one end in contact with the separator pawl 3 and the other end in contact with the underside of the bent portion 28 so that the separator pawl 3 is free to move vertically when the member 26 is in raised position (or when the first inner plate 14 is in raised position) and that the separator pawl 3 assumes its uppermost position when the member 26 is in lowered position (or when the first inner plate 14 is in lowered position). Likewise, an unshown member 26' on the opposite side serves to position the second containing chamber 38 and to prevent wrong operation, and has an unshown recess 27' formed at one end thereof for engagement with the guide shaft $9_0$ or $9_0'$ and and L-shaped member 28 formed at the other end. The member 26' is vertically movable under the control of guide shaft 25 and square hole 29', not shown, and is normally biased upwardly by an unshown spring 30'. The bent portion 28' intervenes between the first inner plate 14 and the cassette body 1 so that lowering of the first inner plate 14 depresses the bent portion 28' to lower the member 26' so as to break the engagement between the recess 27' and the guide shaft $9_0$ or $9_0'$. An unshown spring 31' is rockably mounted on the side plate 2', and has one end in contact with the separator pawl 3' and the other end in contact with the underside of the bent portion 28' of the member 26' so that the separator pawl 3' is free to move vertically when the member 26' is in raised position (or when the first inner plate 14 is in raised position) and that the separator pawl 3' assumes its uppermost position when the member 26' is in lowered position (or when the first inner plate 14 is in lowered position).

In FIGS. 2 to 4, projections 32 and 32' provided in the second containing chamber 38 adjacent the separator pawls 3 and 3' are spaced apart by a distance smaller than the width of the copy mediums contained in the second containing chamber 38 and are designed such that the lower surfaces of these projections bear against the copy mediums so as to prevent curling, floating or the like of the copy mediums and to prevent the second copy mediums 7 from riding on top of the separator pawls 3, 3'. There are further provided copy medium keep pawls 33, 33' for preventing two of copy mediums 5 from being fed at a time, click springs 35, 35' for positioning the second containing chamber 38 in place, and projections 36, 36' provided on the bottom surface of the second inner plate 12 adjacent the feed means 11 and contacting the top of the copy mediums on the first inner plate 14 to raise the second inner plate 12.

Operation will now be described with reference to the drawings. Description will first be made of the process for locking the first inner plate 14 into the position of FIG. 2 from the position of FIG. 3 in which feeding can be effected from the first load of copy mediums 5, and then introducing the first load of copy mediums 5. When the handle 22 is gripped and raised, the levers 21 and 21' of FIGS. 5 and 6 are rotated clockwise about the shafts 23 and 23', as shown, thereby depressing the shafts 24 and 24' secured to the first inner plate 14. By this, the first inner plate 14 is downwardly pivoted about the shaft 10 against the force of the compression springs 15 and 15' until it generally reaches the neighborhood of the bottom surface of the cassette body 1, whereupon the lock plate 18 is engaged by the lock pawl 17 to accompish locking. At the same time, the lowering of the first inner plate 14 also causes the member 26 to be lowered against the force of the spring 30 to break the engagement between the guide shaft 9' and the member 26, so that the second containing chamber 38 becomes slidable along the elongated slot 8 in the side plate 2.

Also, lowering of the member 26 causes the spring 31 to be rotated counter-clockwise to thereby raise and stop the separator pawl 3 at its uppermost position.

An unchown member 26' attached to the side plate 2' performs the same function as described above, that is, it renders the second containing chamber 38 slidable and raises and stops the separator pawl 3' at its uppermost position. In such position (FIG. 2), the first load of copy mediums 5 is inserted through an opening between the front portion of the second containing chamber 38 and the separator pawls 3', 3'. The insertion of these copy mediums may readily be done because the separator pawls 3, 3' are then stopped at their uppermost positions. The manner in which the first copy mediums 5 may be fed by the feed means 11 is illustrated in FIG. 3, from which it is seen that when the lock plate 18 is actuated in the direction opposite to that of arrow, it is moved along the guide screws 19, 19' and out of engagement with the lock pawl 17 secured to the first inner plate 14, so that this plate 14 is pivoted upwardly about the shaft 10 by the upward force of the compression springs 15, 15' until the first load of copy mediums 5 is urged into contact with the underside of the separator pawls 3, 3', thus becoming ready to be fed. At the same time, the upward movement of the first inner plate 14 causes the member 26 to be raised along the guide shaft 25 and square hole 29 by the force of the spring 30 until the member 26 is brought into engagement with the guide shaft 9' secured to the second containing chamber 38, which is thus fixed against mevement. Also, the upward movement of the member 26 breaks away the contact between the spring 31 and the separator pawls 3, 3' to permit the pawls 3, 3' now to be urged into contact with the first load of copy mediums 5 by the compression springs 15, 15' through the agency of the first inner plate 14. In order to accomplish the shift from the position of FIG. 3 to the position of FIG. 4, i.e. from the position in which the first load of copy mediums 5 is ready to be fed to the position in which the second load of copy mediums 7 is ready to be fed, the handle 22 is gripped and raised in the same manner as described above, to thereby lock the first inner plate 14 and break the engagement between the member 26 and the guide shaft 9' (FIG. 2). Thereupon, the separator pawls 3 and 3' are raised and stopped at their uppermost positions. Subsequently, the second load of copy mediums 7 to be used for copying is inserted into the second containing chamber 38 so as to pass below the lower ends of the projections 32, 32', whereafter the handle 37 is gripped and actuated to force the chamber 38 inwardly along the elongated slots 8, 8' until it is stopped at the position near the feed means 11, whereupon the guide shaft 9' is urged against the end walls of the elongated slots 8, 8' by the force of the click spring 35' and thus, the second containing chamber 38 is stopped.

Since the separator pawls 3, 3' are then stopped at their uppermost positions and the copy mediums are kept beneath the undersides of the projections 32, 32', it is ensured that the leading end of the load of copy mediums 7 comes below the undersides of the separator pawls 3, 3' without the possibility of riding on the upper surfaces of the pawls 3, 3' to cause such troubles as feeding of multiple sheets at a time, misregistration, oblique movement of copy sheets, etc.

When the lock plate 18 is then actuated in the direction opposite to that of arrow, it is moved along the guide screws 19, 19' and out of engagement with the lock pawl 7 secured to the first inner plate 14, so that the first inner plate 14 is upwardly pivoted about the shaft 10 by the force of the compression springs 15, 15' in the manner as shown in FIG. 4, until the upper surface of the first load of copy mediums 5 is urged into contact with the projection 36 provided on the front underside of the second inner plate 12, which is hinged at 13 to the member 6 forming the second containing chamber 38 and pivotable only upwardly, whereby the second inner plate 12 is raised to urge the second load of copy mediums 7 against the undersides of the separator pawls 3, 3' and thus, the copy mediums 7 become ready to be fed. More specifically, as is shown in FIGS. 5 and 6, the upward movement of the first inner plate 14 causes the member 26 to be raised by the force of the spring 30 so that engagement occurs between the guide shaft 9 and the recess 27 to fix the second containing chamber 38 against movement, and the upward movement of the member 26 also brings the spring 31 out of pressure contact with the undersides of the separtor pawls 3, 3' to permit these palws 3, 3' to press against the second load of copy mediums 7 through the first inner plate 14.

With the above-described construction, the present invention eliminates the cumbersome procedures including cassette replacement and enables both-side printing to be simply achieved by using the upper one of the two upper and lower copy medium containing chambers for the purpose of backside printing, whether the number of copies to be produced is great or small. More specifically, the both-side printing can be simply achieved by first charging the lower containing chamber with a load of fresh copy mediums and using such copy mediums for one-side printing, thereafter placing these one-side printed copy mediums into the upper containing chamber with their back side positioned for copying, and then moving the upper containing chamber to the feeding position. Also, feeding of copy mediums without cassette replacement can be simply effected by charging the upper and lower containing chambers with different sizes of copy mediums. To achieve this, the inner plate of the lower containing chamber may be depressed and locked, whereafter the upper containing chamber may be withdrawn so that the inner plate of the lower containing chamber may be unlocked to permit copy mediums to be fed from the lower containing chamber; or the lower containing chamber may be depressed and locked, whereafter the upper containing chamber may be moved to the feeding position, and then the inner plate of the lower chamber may be unlocked to permit copy mediums of different size to be fed from the upper containing chamber.

Figure 9:
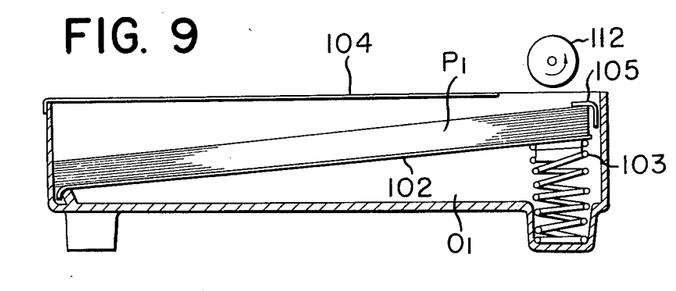
FIG. 9 is a cross-sectional view of a feeding cassette according to the prior art.

Another embodiment of the present invention will now be described in detail with reference to the drawings. In the conventional feed cassette, as shown in FIG. 9, a load of copy mediums P1 is carried on an inner plate 102 and normally biased upwardly by a spring 103 into pressure contact with a separator pawl 105 so that the copy mediums may successively be separated and fed by the separator pawl 105. In such cassette, the cassette body C1 could carry thereon only one type of copy mediums.

Figure 10:
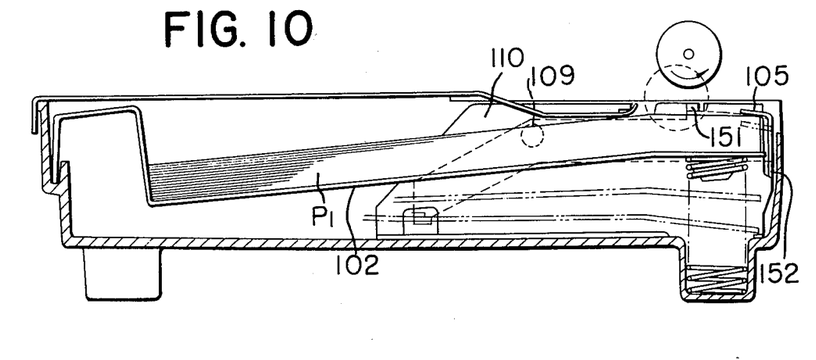
FIG. 10 is a cross-sectional view of a cassette according to one of the embodiments of the present invention.
Figure 11:
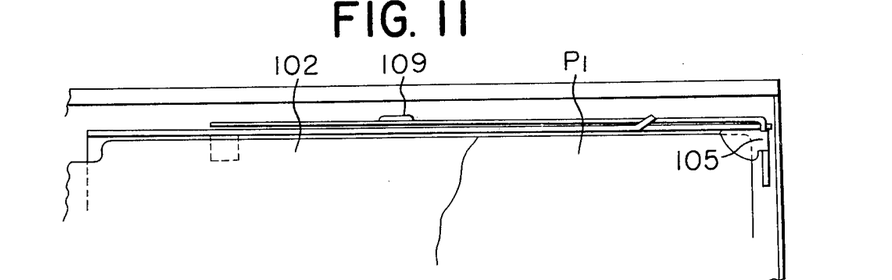
FIG. 11 is a fragmentary plan view of the conventional feed cassette.
Figure 12:
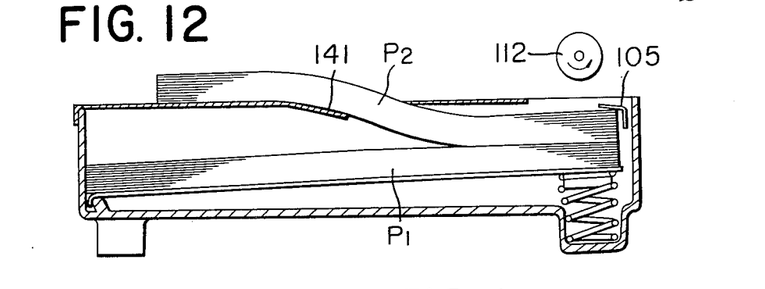
FIGS. 12, 13 and 16 are cross-sectional views of another embodiment of the present invention.
Figure 13:
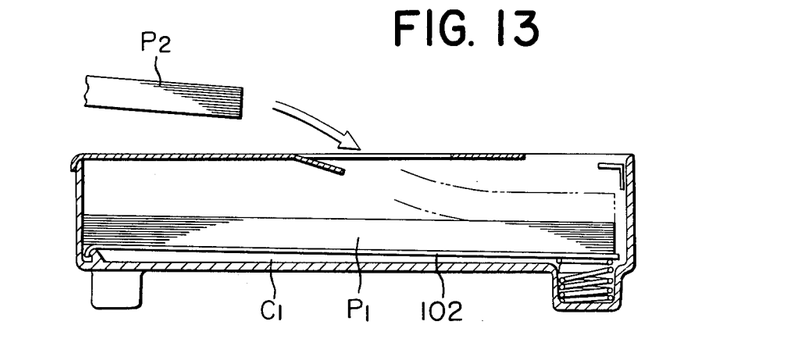
Figure 14:
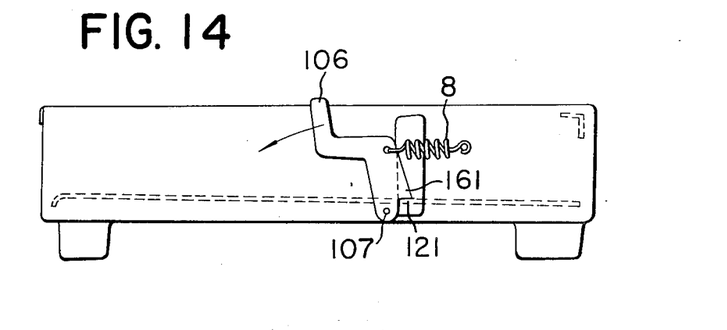
FIGS. 14 and 15 illustrate an inner plate lock mechanism.
Figure 15:
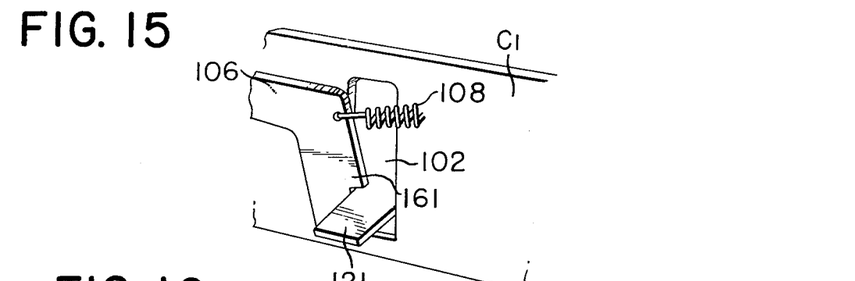

In view of this, the present invention is designed as shown in FIGS. 12 to 16. In the embodiment of the feed cassette as shown in FIG. 12, there is provided a mechanism for locking the inner plate 102 against upward movement when it has been depressed nearly to the bottom of the cassette body C1 against the force of the spring 103. An example of such lock mechanism is shown in FIGS. 14 and 15, wherein the inner plate 102 is provided with a projection 121 and a lever 106 formed with a cut-away 161 for engagement with the projection 121 is mounted for rotation about a pivot 107 on the cassette body C1. The lever 106 is biased for clockwise rotation by a lever spring 108. Depression of the projection 121 provided to the inner plate 102 causes the lever 106 to be rotated counter-clockwise until the cut-away 161 of the lever 106 engages the projection 121 in the neighborhood of the bottom of the cassette body C1, thus locking the inner plate 102. Further, as seen in FIG. 10, when the inner plate 102 has been locked, the spacing between the top surface of the copy mediums P1 carried on the inner plate 102 and the separator pawl 105 may become wider. More specifically, the separator pawl 105, as shown in FIGS. 10 and 11, is mounted on a separator pawl mount plate 110 for pivotal movement about a pivot 109 and the upper and lower limits of movement of the separator pawl 105 are defined by stops 151 and 152 provided on the separator pawl mount plate 110. When the inner plate 102 has been depressed against the force of the spring 103, the separator pawl 105, which has so far been urged against the copy mediums P1 on the inner plate 102 by the spring 103, lowers from gravity until it is stopped by the stop 152. The inner plate 102 may be further lowered until the spacing between the load of copy mediums P1 on the inner plate 102 and the separator pawl 105 becomes wider, whereupon the inner plate 102 may be locked.

On the other hand, the cassette cover 104 is formed with an inlet port 141 so that after the inner plate 102 has been locked, the leading end of the second load of copy mediums P2 is inserted through the inlet port into the space between the separator pawl 105 and the load of copy mediums P1 to rotate the aforesaid lever 106 counter-clockwise and unlock the inner plate 102. Such insertion of the copy mediums P2 may easily be done because the inner plate 102 is locked to provide a spacing between the top surface of the copy mediums P1 and the separator pawl 105. The inner plate 102, when unlocked, is urged upwardly by the force of the spring 103 to raise the separator pawl 105 with the copy mediums P1 and P2 until stopped by the stop 151, whereupon the copy mediums P2 becomes urged against the separator pawl 105, thus becoming ready to be fed. Thus, when the feed means depresses the load of copy mediums to the feeding position, the separator pawl 105 also lowers from gravity while keeping contact with the load of copy mediums, thereby effecting separation and feeding of the successive copy mediums.

Figure 16:
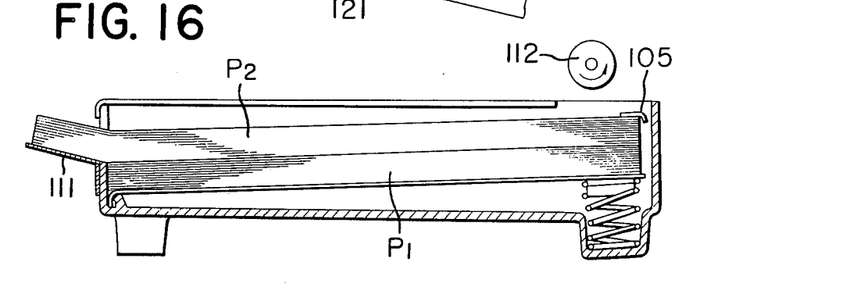

The inlet port for the copy mediums P2 may also be provided in that side of the feed cassette C1 opposite to the copy medium outlet port, as is shown in FIG. 16.

The present invention is applicable not only to the above-described type of feed cassette for copying machines but also to the feed cassettes for paper, metal, plastics and other recording mediums or to the feed cassette for thin sheets of ordinary paper, metal, plastics and so forth.

With the above-described construction, the present invention enables various types of copy mediums to be fed from a single cassette and thus, it conveniently eliminates the need to provide an exclusive cassette for each type of copy medium as has been conventional. Particularly, the cassette of the present invention requires only one containing portion common to the portion for containing a second load of copy mediums, and this means a greater simplicity of the mechanism and economical advantage.

Figure 17:
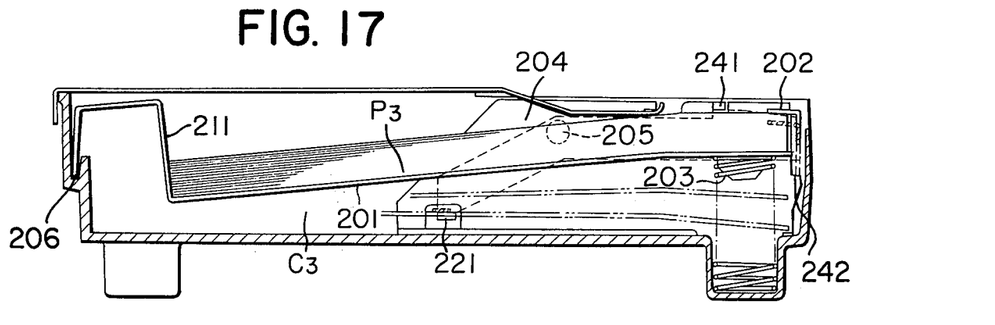
FIG. 17 is a cross-sectional view showing a further embodiment of the present invention.
Figure 18:
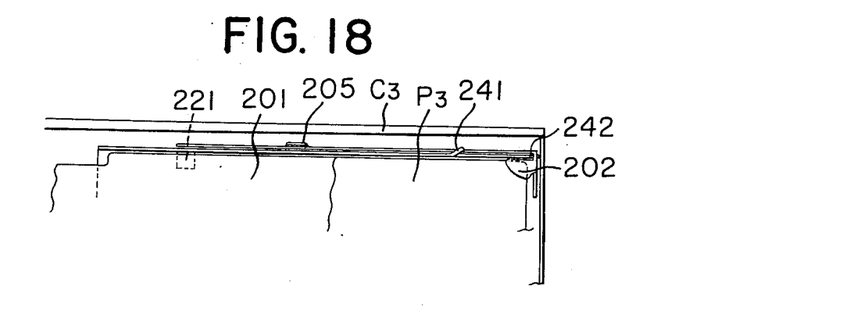
FIG. 18 is a fragmentary plan view of the embodiment shown in FIG. 17.

A further embodiment of the present invention will hereinafter be described in detail with reference to the drawings. Referring to FIG. 17, an inner plate 201 carrying thereon a load of copy mediums P3 is pivotable about a pivot 206 and normally biased upwardly by a spring 203 so as to urge the load of copy mediums P3 on the inner plate 201 against a separator pawl 202. The separator pawl 202 is mounted on a separator pawl mount plate 204 for pivotal movement about a pivot 205, and the vertical movement of the pawl 202 is limited by stops 241 and 242 provided on the separator pawl mount palte 204. When the inner plate 201 has been lowered against the spring 203, the separator pawl 202 rocks downwardly from gravity until it is stopped by the stop 242, and when the inner plate 201 has been raised, the separator pawl 202 is pivoted upwardly with the inner plate until stopped by the stop 241. The positions of the stops 241 and 242 are set so that the separator pawl assumes appropriate positions. For example, when the feed means in a copying machine or the like depresses the copy mediums P3 to the feeding position, the separator pawl 202 also lowers from gravity while keeping contact with the top surface of the copy mediums P3 to thereby effect separation and feeding of the copy mediums.

After the separator pawl 202 has been stopped by the lower stop 242, further depression of the inner plate 202 causes a projection 221 at one end of the separator pawl 202 to be depressed by the underside of the pawl 202. Such depression of the projection 221 in turn causes the separator pawl 202 to be pivotally moved about the pivot 205 to raise the pawled portion of the separator pawl 202.

With the spacing between the separator pawl 202 and the top surface of the copy mediums P3 being so widened, the copy mediums P3 may be inserted into between the separator pawl 202 and the inner plate 201, whereafter the inner plate again loaded with the copy mediums P3 may be raised by the spring 203 until the separator pawl 203 is stopped by the stop 241, thus becoming ready to feed.

With the above-described construction, the present embodiment enables the carrier (cassette or the like) to be fully loaded with copy mediums much more easily than in the conventional construction, because a wider spacing is provided between the separator pawl 202 and the inner plate 201 during such loading.

Although the present embodiment has been described with respect to a carrier for copy mediums in copying machine or the like, the carrier of the present embodiment is usable not only for the copy or transfer mediums used with copying or printing machines but also for thin sheets of paper, metal, plastics or the like.

We claim:

1. A copy medium carrier comprising:
   first copy medium containing means having a front end pivotable about a portion thereof adjacent a rear end thereof;
   second copy medium containing means having a front end pivotable substantially vertically;
   means for separating the copy medium contained in said first and second copy medium containing means to feed the copy medium one by one;
   means for normally urging said first copy medium containing means towards said separating means;
   said separating means being vertically movable to be on a leading edge of the copy medium by the deadweight thereof when copy medium feeding means acts on the copy medium, and said leading edge of the copy medium being urged towards the separating means by said urging means, when the copy medium feeding means does not act on the copy medium,
   said second copy medium containing means being movable in the direction of the feeding of the copy medium between a first position wherein the topmost of the copy medium contained in said first copy medium containing means is engaged with said separating means by said urging means, and a second position wherein the topmost of the copy medium contained in said second copy medium containing means is engaged with said separating means by said urging means through said first copy medium containing means,
   the copy medium within said first copy medium containing means and the copy medium within said second copy medium containing means being capable of being fed from the same position and through the same separating means.

2. A carrier according to claim 1, further comprising first locking means for maintaining said first copy medium containing means at a lower position, and second locking means for maintaining said second copy medium containing means at its first position.

3. A carrier according to claim 2, further comprising means for preventing the rising of the copy medium, said preventing means having a member which contacts the upper surface of a lateral portion of the topmost copy medium.

4. A carrier according to claim 1, wherein said carrier is attachable to and detachable from a copying apparatus.

5. A carrier according to claim 1, further comprising a handle for moving said second copy medium containing means between the first position and the second position thereof.

6. A copy medium carrier comprising:
   copy medium carrying means having a front end pivotable about a portion thereof adjacent a rear end thereof;
   means for separating the copy medium to feed the copy medium one by one;
   means for normally urging said copy medium carrying means towards said separating means;
   said separating means being vertically movable to be on a leading edge of the copy medium by the deadweight thereof when copy medium feeding means acts on the copy medium, and said leading edge of the copy medium being urged towards the separating means by said urging means, when the copy medium feeding means does not act on the copy medium;
   a cover for said carrying means said cover having an opening for inserting therethrough other copy medium other than the copy medium within the copy medium carrying means to serve another copy medium carrying means;

the topmost of the copy medium contained in said copy medium carrying means is engaged with said separating means by said urging means when the copy medium within the copy medium carrying means is to be fed, whereas, when said other copy medium is to be fed, said other copy medium is inserted through said opening of said cover of said copy medium carrying means so that the topmost of said other copy medium is engaged with said separating means by said urging means;

said copy medium within said copy medium carrying means and said other copy medium being capable of being fed from the same position and through the same separating means.

7. A carrier according to claim 6 further comprising locking means for locking said original carrying means at its lower position.

8. A carrier according to claim 7 wherein, when said copy medium carrying means is depressed against the force of the urging means, the separating means is moved away from the feeding position thereof to form a greater clearance between the separating means and the copy medium carrying means.

* * * * *

UNITED STATES PATENT AND TRADEMARK OFFICE
CERTIFICATE OF CORRECTION

PATENT NO. : 4,017,181
DATED : April 12, 1977
INVENTOR(S) : SHIRO KOMABA and YOSHITOMO GOSHIMA It is certified that error appears in the above-identified patent and that said Letters Patent are hereby corrected as shown below:

Column 1, line 67, delete "te" and insert --the--.

Column 2, line 2, delete "wher" and insert --where--.

Column 4, line 25, delete "38'" and insert --38"--;

Column 4, line 49, delete "trasporting" and insert --transporting--.

Column 5, line 11, delete "and" (second occurrence) and insert --an--.

Signed and Sealed this second Day of August 1977

[SEAL]

Attest:

RUTH C. MASON
*Attesting Officer*

C. MARSHALL DANN
*Commissioner of Patents and Trademarks*